July 24, 1962  F. A. WETTSTEIN  3,046,062
RESILIENT BUSHING OR PISTON ELEMENT
Filed Feb. 16, 1960

INVENTOR.
Fritz Alexander Wettstein
BY
Pierce, Schiffler & Parker
Attorneys ary between the bushing holders 3 and 4 which between themselves form a circular groove which receives the flange 10. The groove is axially bounded by two plane

United States Patent Office 3,046,062
Patented July 24, 1962

3,046,062
RESILIENT BUSHING OR PISTON ELEMENT
Fritz Alexander Wettstein, Goteborg, Sweden, assignor to Aktiebolaget Volvo, Goteborg, Sweden, a corporation of Sweden
Filed Feb. 16, 1960, Ser. No. 8,973
Claims priority, application Sweden Feb. 18, 1959
6 Claims. (Cl. 308—4)

The invention relates to a resilient bushing or piston element for reciprocating movement and has for its object to prevent metal-to-metal contact during the movement of relatively movable sliding surfaces, whereby to increase the life of the bushing or piston and their opposite sliding surfaces and to reduce friction and generation of heat between the movable members.

The invention is characterized by the fact that the central portion of the bushing or piston element is provided with a radial flange which forms a resilient support to which axially extending segments are connected which together with the flange form a plurality of elastically adjustable sliding blocks having a cylindrical sliding surface.

Figure 1:
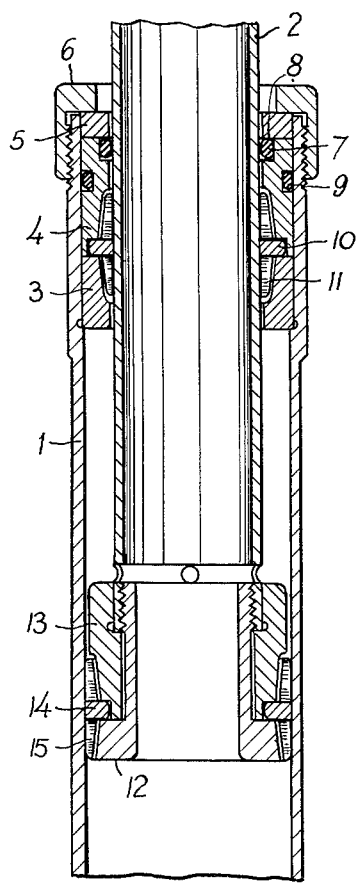
Figure 2:
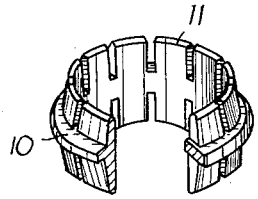
Figure 3:
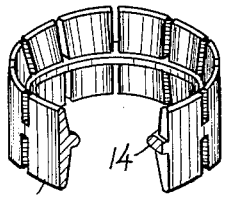
Figure 4:
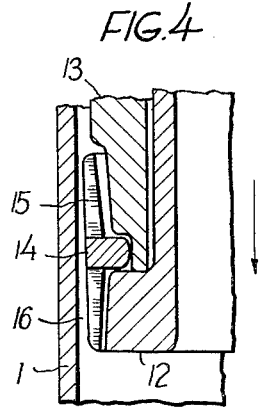

The invention is described more closely hereinbelow with reference to the annexed drawing in which FIG. 1 is a longitudinal sectional view of a piston and cylinder structure comprising a bushing element and a piston element devised in accordance with the invention, FIG. 2 a perspective view of a bushing element with part of it cut out, FIG. 3 a perspective view of a piston element with part of it cut out, and FIG. 4 a detail of FIG. 1 shown on an enlarged scale.

FIG. 1 illustrates a piston and cylinder structure which may be a hydraulic shock absorber or the like. The cylinder 1 and the piston tube 2 are axially movable relative to each other. Effective guide means must be provided between the cylinder and the piston tube as well as between the cylinder and a piston movable therein. To this end, a guiding and sealing device is provided at the upper end of the cylinder, this device comprising annular bushing holders 3 and 4 and a spacer ring 5, all of said parts being tightly inserted between a shoulder in the cylinder 1 and a flanged nut 6 screwed nto the cylinder. At the end of the bushing holder 4 adjacent the spacer ring 5 there is provided an annular groove having inserted therein, in a manner known per se, a sealing device comprising an O-ring 7 of an elastic material and a support ring 8 of a somewhat less elastic material. Between the bushing holder 4 and the cylinder 1 there is similarly provided a fixed sealing device consisting of an O-ring 9 in an annular groove in the bushing holder.

Inserted between the bushing holders 3 and 4 is a bushing element which consists of an annular flange 10 and segments 11 extending axially on both sides from the flange. The form of the bushing element is apparent from FIG. 2. The central portion or flange 10 of the bushing element is axially bounded by two plane surfaces, whereas the outer radial boundary of the flange is preferably a slightly convex surface. The radial thickness of the segments 11 extending on both sides from the flange is smaller than the radial thickness of the flange. Preferably, the thickness of the segments decreases in the direction from the flange toward the ends of the segments. The inner surfaces of the flange 10 and the segments 11 form together the cylindrical sliding surface of the bushing element. In order to facilitate the formation of a supporting liquid film, the ends of the segments 11 are well rounded at the cylindrical sliding face.

The flange 10 of the bushing element is movably mounted in the bushing holders 3 and 4 which between themselves form a circular groove which receives the flange 10. The groove is axially bounded by two plane surfaces and radially by a cylindrical surface. The groove and the flange 10 are dimensioned such as to provide for a small axial and radial clearance therebetween.

The piston tube 2 is slidably mounted in the bushing element 10, 11. The radial clearances between the piston tube 2 and the bushing holders 3 and 4 and the spacer ring 5 are larger than the clearance between the piston tube 2 and the bushing element 10, 11. Consequently, the piston tube 2 is guided solely by the bushing element 10, 11.

A piston holder 13 is atttached to the other end of the piston tube 2 by means of a flanged nut 12. Inserted between the flanged nut 12 and the piston holder 13 is a piston element 14, 15 which comprises a central flanged portion 14 and segments 15 which on both sides extend axially from the flange. The form of the piston element 14, 15 is apparent from FIG. 3. It is similar in principle to the bushing element 10, 11 and need therefore not be described in dettail. By means of the flange 14 the piston element 14, 15 is movably mounted in a groove between the flanged nut 12 and the piston holder 13. The radial clearance between the piston holder 13 and the cylinder 1 is larger than the clearance between the piston element 14, 15 and the cylinder 1 so that the cylinder 1 is solely guided by the piston element 14, 15.

The mode of operation of the bushing and piston device according to the invention is as follows. Due to the fact that the bushing element 10, 11 and the piston element 14, 15 by means of a number of axial slots are divided into two sets of segments, one on each side of a central flange portion, two adjacent segments on either side of the flange form, together with part of the flange, a sliding block which readily can adjust itself at small angles to the normal position, due to the flexibility of the interconnecting flange. Such adjustment under elastic deformation is possible due to the fact that the flange has a comparatively low torsional stiffness and that the end portions connected to the flange are divided by the axial slots into segments which while increasing the stiffness of the flange portion still permit sufficient elastic deformation.

In operation it is assumed that the sliding surfaces of the piston tube 2 and the cylinder 1 are lubricated or that the cylinder 1 is entirely filled with a hydraulic fluid having lubricating properties. If, for instance. the piston moves downwards according to the arrow in FIG. 4, an increased pressure will be built up between the lower edge of the piston element 14, 15 and the sliding surface of the cylinder 1, this being a result of the fact that the lower outer edge of the piston element 14, 15 is rounded. Due to this increased pressure, the sliding blocks will assume oblique positions, as shown in an exaggerated manner in FIG. 4, and a wedge-shaped liquid film 16 will be built up between the sliding blocks and the sliding surface of the cylinder 1. In accordance with the classic theory of journal bearings very high pressures can be produced in such a wedge-shaped film, which pressures may support great loads and which prevent metal-to-metal contact during movement of the sliding surfaces. It will thus be apparent that a supporting liquid film can be built up between the sliding blocks and the sliding surface as a result of the elastic adjustability of the sliding blocks of the piston element 14, 15. This supporting liquid film prevents wear and seizure between the sliding blocks and the sliding surface, resulting in increased life and reliability. In addition, the supporting liquid film reduces friction and generation of heat.

The elastic adjustability of the sliding blocks of the piston element 14, 15 also permit the blocks to adjust themselves to small deviations of the sliding surface from the true cylindrical form. Such deviations may result from errors in manufacture or from elastic deformations under load. Also in this case, the construction of the piston element in accordance with the invention contributes to increased reliability on operation, reduced wear and longer life. The mode of operation of the bushing element 10, 11 is obviously similar to that of the piston element 14, 15 and need therefore not be described in detail.

What I claim is:

1. A resilient bushing or piston element for relatively reciprocating motion comprising a central circular flange of comparatively small cross section and a plurality of axially extending segments directly and integrally connected to said flange, said segments having a common cylindrical sliding surface and being spaced from each other so as to leave the intermediate portions of said flange free to flex.

2. A resilient bushing or piston element according to claim 1, in which said flange is axially bounded by two plane parallel surfaces located at right angles to the axis of the element.

3. A resilient bushing or piston element for relatively reciprocating motion comprising a central circular flange having a cross section bounded in the axial direction by two plane parallel surfaces at right angles to the axis of the element and in the radial direction by a convex surface, and a plurality of axially extending segments directly and integrally connected to said flange, said segments being spaced from each other so as to leave the intermediate portions of said flange free to flex.

4. A resilient bushing or piston element for relatively reciprocating motion comprising a central circular flange of comparatively small cross section and a plurality of axially extending segments directly and integrally connected to said flange, said segments being spaced from each other so as to leave the intermediate portions of said flange free to flex, the radial thickness of said segments decreasing axially from the flange towards the ends of the segments.

5. A device comprising a resilient bushing or piston element for relatively reciprocating motion and two holders, said element consisting of a central circular flange of comparatively small cross section and a plurality of axially extending segments directly and integrally connected to said flange and being spaced from each other so as to leave the intermediate portions of said flange free to flex, said segments having a common cylindrical sliding surface, and said flange being movably mounted in a groove formed between the two holders.

6. A device according to claim 5, in which said groove formed between said holders is axially bounded by two plane parallel surfaces located at right angles to the axis, and the bottom of the groove is a cylindrical surface.

References Cited in the file of this patent

UNITED STATES PATENTS

| | | |
|---|---|---|
| 1,019,424 | Clough | Mar. 5, 1912 |
| 2,217,200 | Fast | Oct. 8, 1940 |
| 2,424,028 | Haeberlein | July 15, 1947 |

FOREIGN PATENTS

| | | |
|---|---|---|
| 277,862 | Great Britain | Sept. 29, 1927 |
| 85,783 | Sweden | Mar. 10, 1931 |